United States Patent
Song et al.

(10) Patent No.: US 10,936,075 B2
(45) Date of Patent: Mar. 2, 2021

(54) APPARATUS AND METHOD FOR ADAPTIVE GESTURE RECOGNITION IN PORTABLE TERMINAL

(71) Applicant: Samsung Electronics Co., Ltd., Gyeonggi-do (KR)

(72) Inventors: Hee-Jun Song, Seoul (KR); Nam-Hoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 438 days.

(21) Appl. No.: 15/379,314

(22) Filed: Dec. 14, 2016

(65) Prior Publication Data

US 2017/0097686 A1    Apr. 6, 2017

Related U.S. Application Data

(63) Continuation of application No. 13/267,639, filed on Oct. 6, 2011, now abandoned.

(30) Foreign Application Priority Data

Oct. 6, 2010    (KR) .................... 10-2010-0097087

(51) Int. Cl.
*G06F 3/033* (2013.01)
*G06F 3/01* (2006.01)
(Continued)

(52) U.S. Cl.
CPC ............ *G06F 3/017* (2013.01); *G06F 1/1684* (2013.01); *G06F 1/1694* (2013.01);
(Continued)

(58) Field of Classification Search
CPC .. G06F 3/0484; G06F 3/04883; G06F 1/1684; G06F 1/1694; G06F 2200/1637;
(Continued)

(56) References Cited

U.S. PATENT DOCUMENTS

| | | | |
|---|---|---|---|
| 8,607,167 B2 * | 12/2013 | Matas | G01C 21/3664 715/863 |
| 2002/0129288 A1 * | 9/2002 | Loh | G06F 1/3203 713/320 |

(Continued)

FOREIGN PATENT DOCUMENTS

| | | |
|---|---|---|
| CN | 101321352 A | 12/2008 |
| CN | 101743739 A | 6/2010 |

(Continued)

OTHER PUBLICATIONS

Office Action dated May 16, 2018 in connection with European Patent Application No. 11 830 921.0.

(Continued)

*Primary Examiner* — Anil N Kumar

(57) ABSTRACT

An apparatus and method for gesture recognition in a portable terminal. An operation of the portable terminal includes determining a user situation by using at least one situation information, determining a user's gesture by using at least one sensor measurement value, and performing a function corresponding to the user situation and the gesture.

13 Claims, 6 Drawing Sheets

(51) Int. Cl.
  *H04M 1/725* (2021.01)
  *G06F 3/0488* (2013.01)
  *G06F 1/16* (2006.01)
  *G06F 3/0484* (2013.01)

(52) U.S. Cl.
  CPC .... *G06F 3/04883* (2013.01); *H04M 1/72569* (2013.01); *G06F 3/0484* (2013.01); *G06F 2200/1637* (2013.01); *H04M 1/72572* (2013.01); *H04M 2250/12* (2013.01)

(58) Field of Classification Search
  CPC .............. G06F 3/017; H04M 1/72572; H04M 1/72569; H04M 2250/12
  USPC ................. 715/863, 739, 744–745, 811, 864
  See application file for complete search history.

(56) References Cited

U.S. PATENT DOCUMENTS

| | | | | |
|---|---|---|---|---|
| 2007/0288932 | A1* | 12/2007 | Horvitz | G06Q 10/107 719/313 |
| 2008/0233996 | A1 | 9/2008 | Ogasawara et al. | |
| 2009/0017799 | A1 | 1/2009 | Thorn | |
| 2009/0037849 | A1 | 2/2009 | Immonen et al. | |
| 2010/0060586 | A1 | 3/2010 | Pisula et al. | |
| 2010/0083188 | A1* | 4/2010 | Pance | G06F 1/3231 715/863 |
| 2010/0115461 | A1* | 5/2010 | Onda | G09G 5/14 715/790 |
| 2010/0162182 | A1 | 6/2010 | Oh et al. | |
| 2010/0241958 | A1* | 9/2010 | Fish | G06F 3/04883 715/702 |
| 2010/0275166 | A1 | 10/2010 | Jeon et al. | |
| 2010/0313050 | A1* | 12/2010 | Harrat | H04W 52/0254 713/323 |
| 2011/0032145 | A1* | 2/2011 | Hansen | G01C 21/3679 342/357.34 |
| 2011/0083111 | A1* | 4/2011 | Forutanpour | H04W 4/21 715/863 |
| 2011/0084900 | A1* | 4/2011 | Jacobsen | G06F 1/163 345/156 |
| 2011/0119640 | A1* | 5/2011 | Berkes | G06F 3/011 715/863 |

FOREIGN PATENT DOCUMENTS

| | | |
|---|---|---|
| CN | 101848273 A | 9/2010 |
| JP | 2004-287815 | 10/2004 |
| JP | 2006039615 A | 2/2006 |
| KR | 2001-0017203 | 3/2001 |
| KR | 10-2008-0085767 | 9/2008 |
| KR | 10-2009-0029307 | 3/2009 |
| KR | 20100073743 A | 7/2010 |
| KR | 10-2010-0104875 | 9/2010 |
| WO | 2009/076974 A1 | 6/2009 |

OTHER PUBLICATIONS

Korean Notice of Patent Grant for Korean Application No. 10-2010-0035861, dated Sep. 21, 2017. (3 pages).

Foreign Communication From a Related Counterpart Application, Korean Application No. 10-2017-0035861, Notice of Preliminary Rejection dated Apr. 12, 2017, 10 pages.
Foreign Communication From a Related Counterpart Application, Korean Application No. 10-2010-0097087, Notice of Final Rejection dated Feb. 20, 2017, 5 pages.
Foreign Communication From a Related Counterpart Application, Chinese Application No. 2011800481044, Notice of Preliminary Rejection dated Mar. 2, 2017, 13 pages.
Korean Intellectual Patent Office, "Notice of Final Rejection," Korean Application No. 10-2010-0097087, dated Nov. 17, 2016, 8 pages, publisher KIPO, Mobile Communication Examination Division, Daejeon, Republic of Korea.
Reexamination Decision dated Sep. 5, 2018 in connection with Chinese Patent Application No. 201180048104.4, 37 pages.
Fifth Final Office Action dated Oct. 14, 2016 in connection with U.S. Appl. No. 13/267,369, 19 pages.
Fifth Office Action dated Jun. 23, 2016 in connection with U.S. Appl. No. 13/267,369, 19 pages.
Fourth Final Office Action dated Dec. 24, 2015 in connection with U.S. Appl. No. 13/267,369, 20 pages.
Fourth Office Action dated Sep. 10, 2015 in connection with U.S. Appl. No. 13/267,369, 20 pages.
Third Final Office Action dated Apr. 30, 2015 in connection with U.S. Appl. No. 13/267,369, 16 pages.
Third Office Action dated Jan. 9, 2015 in connection with U.S. Appl. No. 13/267,369, 16 pages.
Second Final Office Action dated Sep. 12, 2014 in connection with U.S. Appl. No. 13/267,369, 16 pages.
Second Office Action dated May 19, 2014 in connection with U.S. Appl. No. 13/267,369, 15 pages.
First Final Office Action dated Aug. 29, 2013 in connection with U.S. Appl. No. 13/267,369, 14 pages.
First Office Action dated May 9, 2013 in connection with U.S. Appl. No. 13/267,369, 14 pages.
Extended European Search Report dated Jul. 14, 2016 in connection with European Application No. 11830921.0, 7 pages.
Notice of Preliminary Rejection dated Aug. 1, 2016 in connection with Korean Application No. 10-2010-0097087, 8 pages.
Fifth Office Action dated Aug. 11, 2016 in connection with Chinese Application No. 2011800481044, 8 pages.
Office Action dated Feb. 19, 2016 in connection with Chinese Patent Application No. 2011800481044.
Text of the Second Office Action dated Jan. 20, 2015 in connection with Chinese Patent Application No. 2011-80048104.4; 10 pages.
Chinese Office Action dated May 4, 2014 in connection with Chinese Application No. 2011800481044, 11 pages.
International Search Report dated Apr. 27, 2012 in connection with International Patent Application No. PCT/KR2011/007405.
Written Opinion of International Searching Authority dated Apr. 27, 2012 in connection with International Patent Application No. PCT/KR2011/007405.
Summons to attend oral proceedings pursuant to Rule 115(1) EPC dated Apr. 24, 2019 in connection with European Patent Application No. 11 830 921.0, 7 pages.
European Search Report dated Jul. 7, 2020 in connection with European Patent Application No. 20 16 2109, 5 pages.

\* cited by examiner

APPARATUS AND METHOD FOR ADAPTIVE GESTURE RECOGNITION IN PORTABLE TERMINAL

CROSS-REFERENCE TO RELATED APPLICATION(S) AND CLAIM OF PRIORITY

The present application is a continuation of U.S. patent application Ser. No. 13/267,639 filed Oct. 6, 2011, and is related to and claims the benefit under 35 U.S.C. § 119(a) of a Korean patent application filed in the Korean Intellectual Property Office on Oct. 6, 2010 and assigned Serial No. 10-2010-0097087, the entire disclosures of which are hereby incorporated by reference.

TECHNICAL FIELD

The present disclosure relates to a portable terminal. More particularly, the present disclosure relates to an apparatus and method for adaptively recognizing a user's gesture in the portable terminal.

BACKGROUND

Portable terminals have been rapidly distributed due to convenience and necessity, and have become essential tools of modern life. Thus, service providers and terminal manufacturers are providing more additional functions to increase utilization of the portable terminals.

In addition, various input mechanisms are being developed beyond a simple key input so that the portable terminal is more frequently utilized. For example, there is an input mechanism using a user's gesture. That is, the portable terminal recognizes the user's gesture by recognizing a movement of the portable terminal, and can execute a corresponding specific function/application, operation, and so forth.

There are various methods of recognizing a user's gesture by using sensors included in the portable terminal. However, the conventional method of recognizing the gesture in the portable terminal has several problems.

A high quality portable terminal such as a smart phone is becoming more common, and the number of functions desired by a user is on an increasing trend. Therefore, when a specific function is executed by using several limited gestures, the number of available functions is limited. In addition, if one gesture and one function are simply matched, many gestures are required in the execution of the function. Further, the greater the number of gestures to be recognized, the lower the recognition accuracy. Therefore, it becomes difficult to correctly provide various functions desired by a user.

Accordingly, there is a need for a method capable of correctly providing more functions to a user by using a limited number of gestures.

SUMMARY

To address the above-discussed deficiencies of the prior art, it is a primary aspect of the present disclosure to provide an apparatus and method for executing a specific function by using a user's gesture in a portable terminal.

Another aspect of the present disclosure is to provide an apparatus and method for increasing efficiency of a function execution service by using a gesture in a portable terminal.

Another aspect of the present disclosure is to provide an apparatus and method for correctively providing more functions to a user by using a limited number of gestures in a portable terminal.

In accordance with an aspect of the present disclosure, a method of operating a portable terminal is provided. The method includes determining a user situation by using at least one situation information, determining a user's gesture by using at least one sensor measurement value, and performing a function corresponding to the user situation and the gesture.

In accordance with another aspect of the present disclosure, a portable terminal apparatus that includes a controller for controlling a function of the portable terminal is provided. The controller includes a situation recognition unit configured to determine a user situation by using at least one situation information. The controller also includes a gesture determining unit configured to determine a user's gesture by using at least one sensor measurement value. The controller further includes a function execution unit configured to perform a function corresponding to the user situation and the gesture.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal.

Hereinafter, a technique for accurately providing more functions to a user by using a limited number of gestures in a portable terminal will be described. In the following description, the portable terminal includes a cellular phone, a Personal Communication System (PCS), a Personal Digital Assistant (PDA), an International Mobile Telecommunication-2000 (IMT2000) terminal, a smart phone, and the like.

The portable terminal according to an embodiment of the present disclosure recognizes a gesture under the following premise.

According to a current user situation, a single gesture may be matched to multiple functions. That is, the present disclosure assumes that a user has a different tendency of using the terminal according to the user situation. For example, a function most frequently used by the user when the user is at home may be different from an application preferred when the user is on the move, in a school, or in an office.

In addition, since an inaccuracy and an outer interference are present when recognizing a gesture, a data value is not always correctly obtained. Therefore, in order to minimize a determination error, a difference between identifiable operations should be realized.

Figure 1:
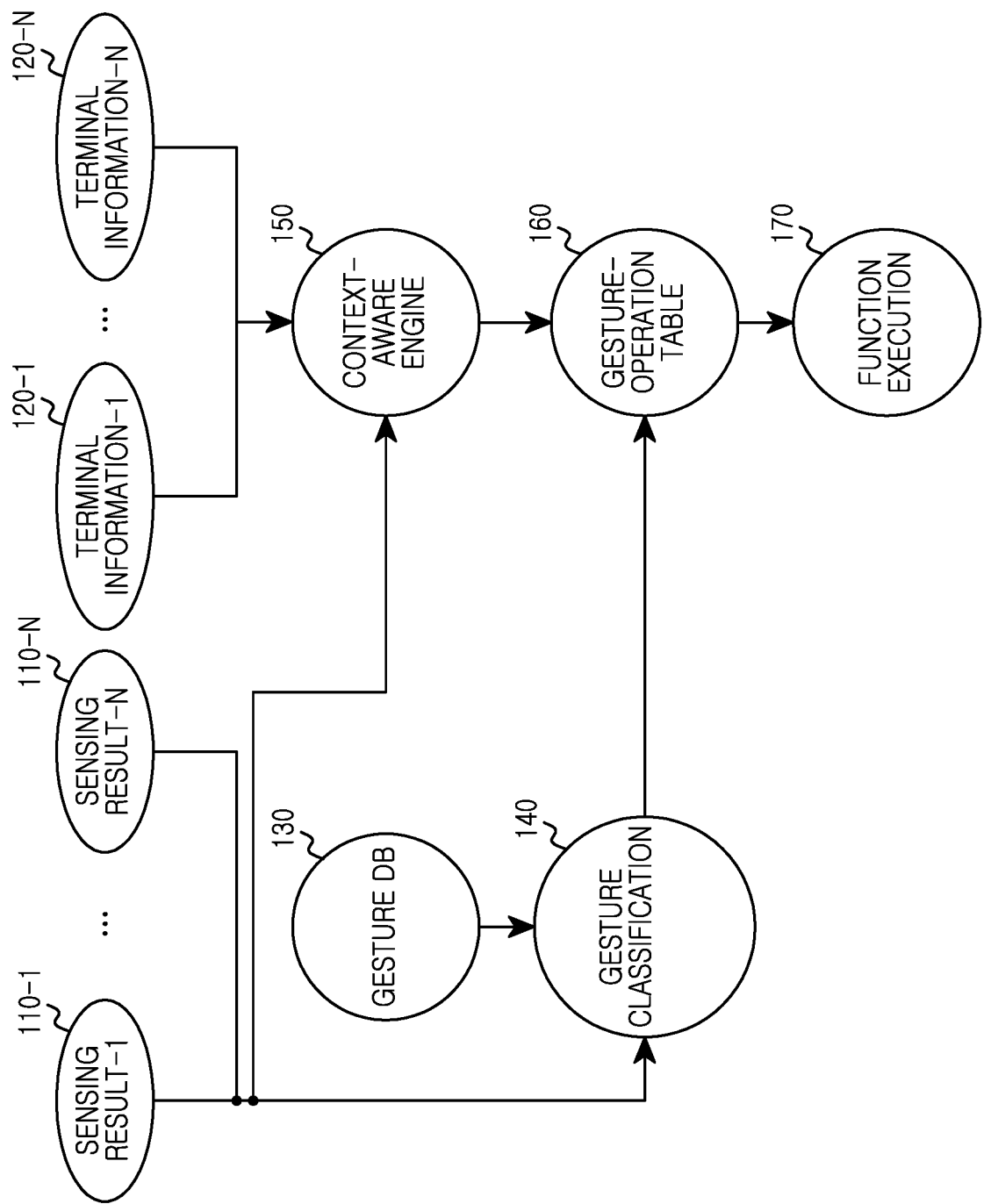
FIG. 1 illustrates a process of executing a function based on a gesture of a portable terminal according to an embodiment of the present disclosure.

FIG. 1 illustrates a process of executing a function based on a gesture of a portable terminal according to an embodiment of the present disclosure.

Referring to FIG. 1, a sensing result-1 110-1 to a sensing result-N 110-N for determining a gesture and terminal information-1 120-1 to terminal information-N 120-N for determining a user situation are input.

A gesture DataBase (DB) 130 includes a criterion for determining the gesture to be recognized. That is, the gesture DB 130 includes information regarding data of gestures, that is, information for expressing gestures by using at least one sensor measurement value. For example, each of the gestures can be expressed by a combination of specific sensor measurement values, time-series sensor measurement values conforming to a specific order, and the like.

A gesture classification 140 receives the sensing result-1 110-1 to the sensing result-N 110-N, and determines a generated gesture by searching the gesture DB 130 to find a gesture corresponding to the sensing result-1 110-1 to the sensing result-N 110-N. The sensing result-1 110-1 to the sensing result-N 110-N are measurement values of at least one sensor included in the portable terminal to recognize gestures. For example, the at least one sensor may include an accelerator sensor, an earth's magnetic sensor, a pressure sensor, a Global Positioning System (GPS) sensor, an angular velocity sensor, and the like. Herein, the measurement value of the GPS sensor can be provided as information for determining a user situation.

In addition, the gesture classification 140 determines a start of a gesture period, that is, a start of a sensor measurement value constituting the gesture. In other words, the gesture classification 140 determines a specific point at which the gesture starts, and enters a state capable of recognizing the gesture at that point, that is, enters a gesture recognition mode. For example, the gesture period can be determined as follows. According to an embodiment of the present disclosure, the gesture period can be determined by using a key predefined to report a start of the gesture. In this embodiment, the user inputs the predefined key before the start of the gesture so that the portable terminal can know the start of the gesture. According to another embodiment of the present disclosure, the gesture period can be determined by recognizing a start gesture predefined to report a start of the gesture. In this embodiment, the user generates the predefined start gesture so that the portable terminal can know the start of the gesture. For example, the predefined start gesture can be defined as shaking to the left and right.

If an Application Processor (AP) of the portable terminal is in a sleep state, the portable terminal cannot recognize the gesture. However, if the additional key is used to determine the gesture period, the portable terminal is released from the sleep state due to the key input, and thus a problem of the gesture recognition does not occur. Alternatively, if the predefined start gesture is used, the start gesture is not recognized. Therefore, to recognize the gesture even in the sleep state, the portable terminal can additionally have a low power processor (e.g., a Micro COMputer (MiCOM)) capable of obtaining the measurement value of the sensor even if a main processor is in the sleep state. The low power processor can recognize the predefined start gesture even if the main processor is in the sleep state. Accordingly, the main processor can be released from the sleep state right after the generation of the start gesture, or the main processor can be released from the sleep state after the end of the gesture corresponding to a function executed subsequent to the start gesture.

When the start of the gesture period is determined, a context-aware engine 150 collects and analyzes the terminal information-1 120-1 to the terminal information-N 120-N to determine a current user situation. For example, the terminal information-1 120-1 to the terminal information-N 120-N can include user location data, a current time, a frequently used application, a user's call/communication history, a Short Message Service (SMS)/Social Network Service (SNS) usage history, and the like. By using the input terminal information-1 120-1 to terminal information-N 120-N, the context-aware engine 150 determines the user situation. For example, the user situation may include a current user location, information on whether the user is located in a Point Of Interest (POI), a POI class (e.g., office, school, and home), information on whether the user is on the move or stationary, a list of applications most frequently used at a current time zone, a communication means/counterpart most frequently used at the current time zone, and so forth. The aforementioned terminal information and user situation are for exemplary purposes only, and thus other different types of information and situations may be added or partially excluded according to embodiments of the present disclosure.

Figure 2A:
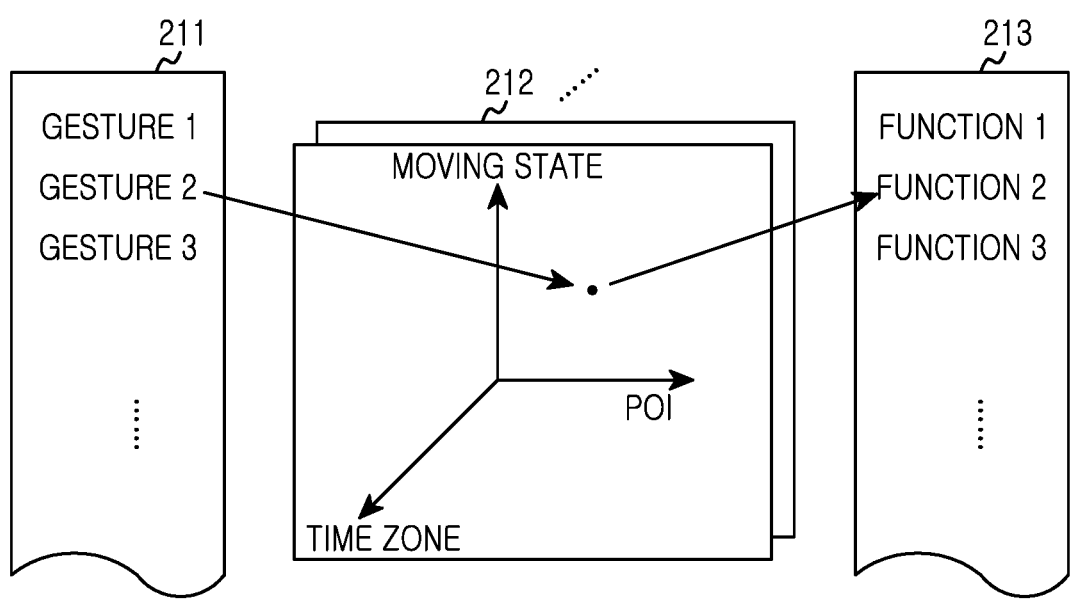
FIGS. 2A and 2B illustrate a structure of a gesture-operation table according to an embodiment of the present disclosure.
Figure 2B:
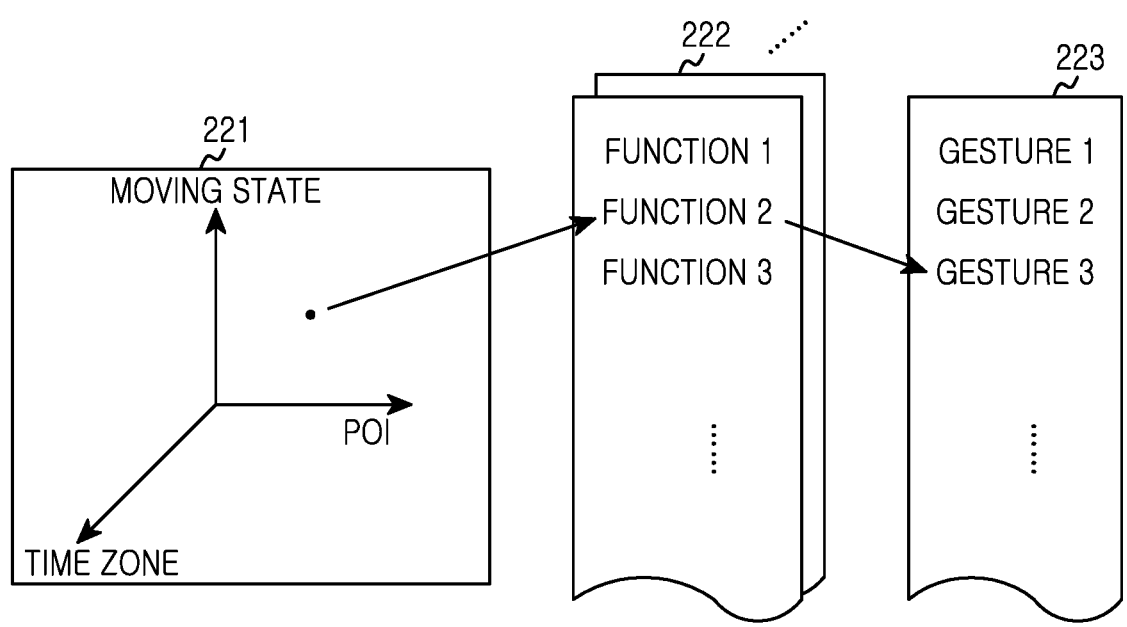

A gesture-operation table 160 defines a matching relation of a function with respect to a gesture and a user situation. In other words, the gesture-operation table 160 defines which function will be executed for the determined gesture and user situation, and outputs a function corresponding to the input gesture and user situation. For example, the gesture-operation table 160 may have the structure of FIG. 2A or FIG. 2B. FIGS. 2A and 2B illustrate a structure of the gesture-operation table 160 according to an embodiment of the present disclosure. Referring to FIG. 2A, the gesture-operation table 160 includes a gesture list 211, user situation lists 212 that are dependent on respective gestures, and a function list 213 corresponding to a combination between a gesture and a user situation. That is, functions corresponding to the combination of the gesture and the user situation (e.g., a moving state, a time zone, and a POI) are defined in the structure of FIG. 2A. If the structure of FIG. 2A is used, the gesture-operation table 160 combines the input user gesture and the input user situation, and searches for the function corresponding to the combination thereof. Referring to FIG. 2B, the gesture-operation table 160 includes a user situation list 221, function lists 222 that are dependent on respective user situations, and a gesture list 223 corresponding to a combination between the user situation and the function. That is, functions corresponding to respective user situations (e.g., a moving state, a time zone, and a POI) are defined and gestures corresponding the respective functions are determined in the structure of FIG. 2B. If the structure of FIG. 2B is used, the gesture-operation table 160 searches for candidate functions corresponding to an input user situation, and selects one input gesture among the candidate functions. In FIGS. 2A and 2B, the user situation consists of three axes such as a moving state, a time zone, and a POI. These axes are for exemplary purposes only, and thus some of the axes can be omitted or another axis can be added.

A function execution 170 performs a function determined by the gesture-operation table 160. For example, the function execution 170 executes an electronic book, a phone book, a text viewer, a video/music player, and the like.

Although not shown in FIG. 1, when entering the gesture recognition mode, the portable terminal can display functions corresponding to respective gestures in the current user situation by using a display means. That is, when entering the gesture recognition mode by using the additional key or the predefined start gesture, the portable terminal can determine the current user situation, and can report functions for the respective gestures to the user usable in the current user situation. For example, the portable terminal can display an icon that represents a matching relation between each function and gesture by using the display means.

Figure 3:
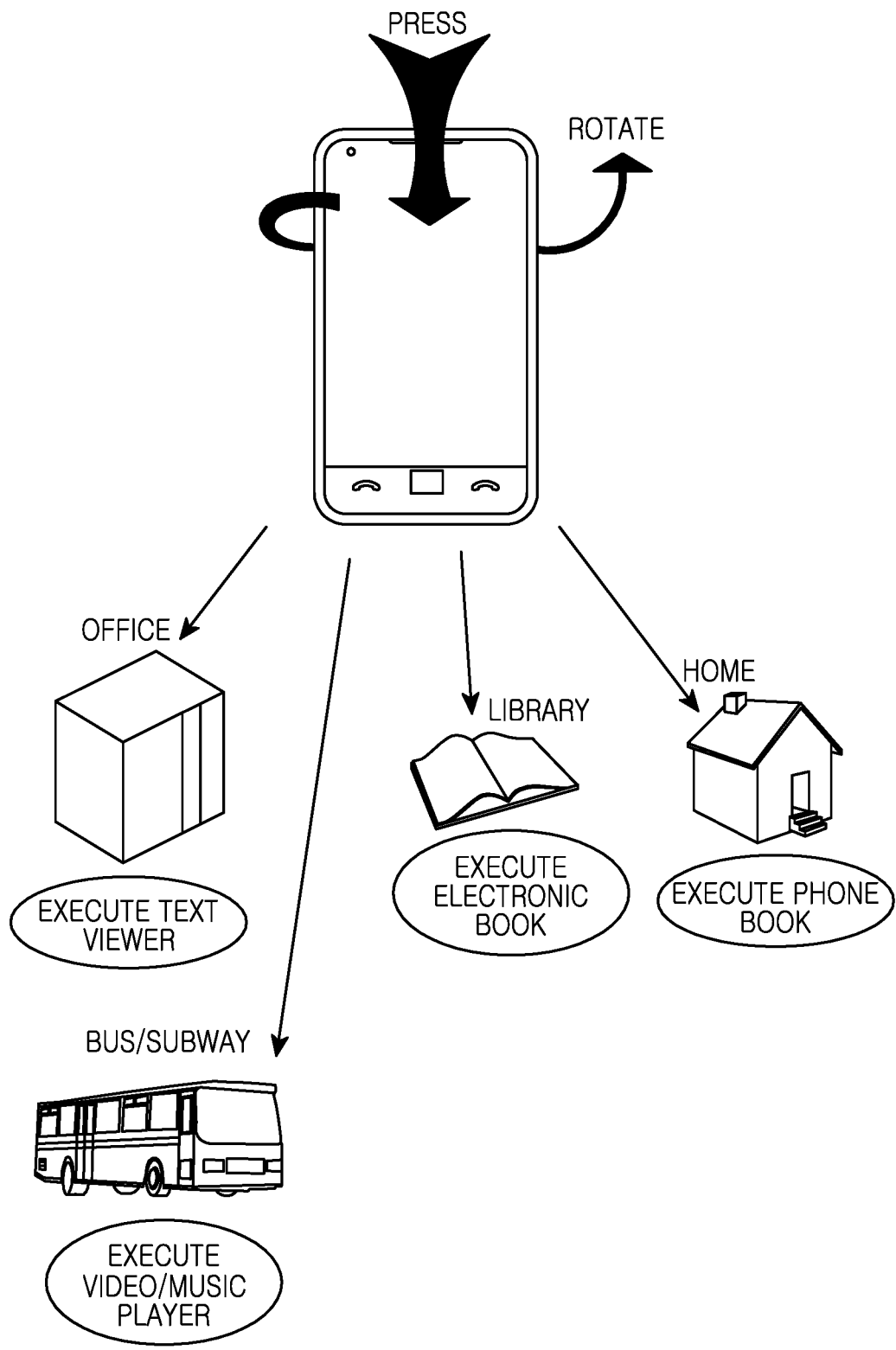
FIG. 3 illustrates a detailed example of a gesture recognition result of a portable terminal according to an embodiment of the present disclosure.

According to the aforementioned gesture processing based on the user situation, a service of FIG. 3 can be implemented. FIG. 3 illustrates a detailed example of a gesture recognition result of a portable terminal according to an embodiment of the present disclosure. An embodiment where a user location is considered as a user environment is illustrated in FIG. 3.

Referring to FIG. 3 four functions are executed in association with a gesture that imposes a pressure on an upper portion of the portable terminal and rotates the portable terminal. That is, when the gesture of pressing and rotating occurs, a text viewer function is executed when the user is in an office, an electronic book function is executed when the user is in a library, a video/music player function is executed when the user is in a bus/subway, and a phone book function is executed when the user is at home.

Figure 4:
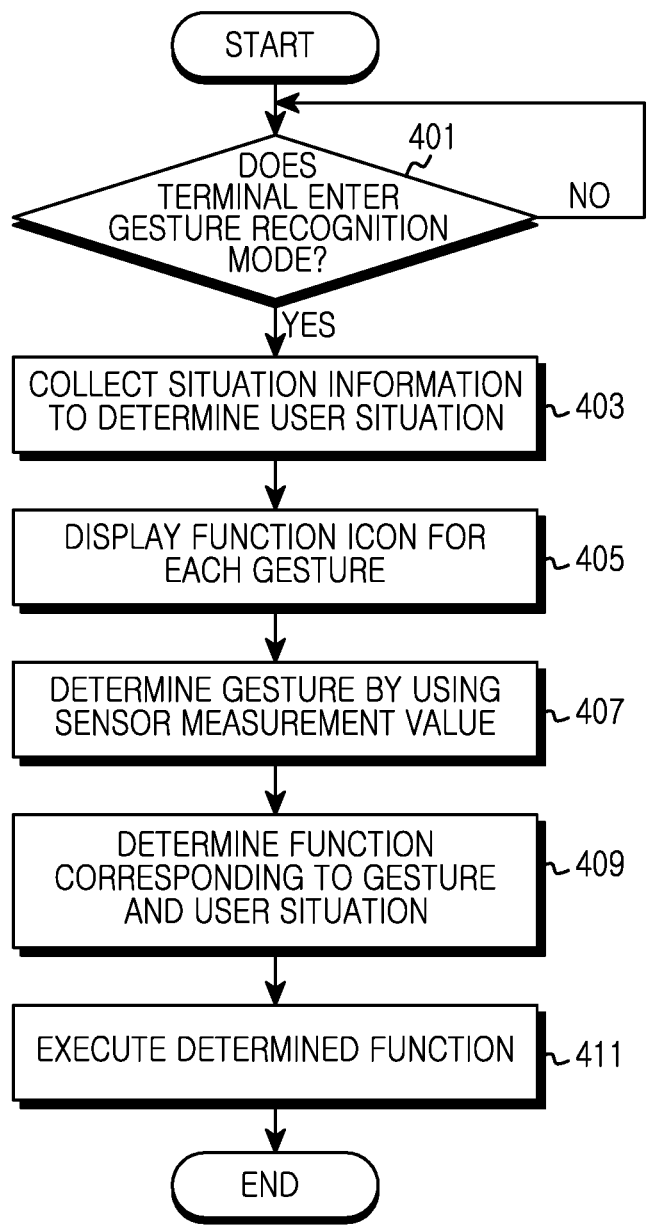
FIG. 4 is a flowchart illustrating a process of operating a portable terminal according to an embodiment of the present disclosure.

FIG. 4 is a flowchart illustrating a process of operating a portable terminal according to an embodiment of the present disclosure.

Referring to FIG. 4, it is determined whether the portable terminal enters a gesture recognition mode in step 401. For example, whether the portable terminal enters the gesture recognition mode can be determined according to whether a key is input or whether a predefined start gesture occurs. If the portable terminal is in a sleep state, the portable terminal is released from the sleep state by an additional key input. Alternatively, the portable terminal employs an additional low power processor, and recognizes the predefined start gesture by the low power processor during the sleep state. When using the low power processor, the portable terminal may be released from the sleep state right after recognizing the predefined start gesture, or may be released from the sleep state after recognizing the gesture for executing a function, that is, after step 407, or may be released from the sleep state after determining the function, that is, after step 409.

When entering the gesture recognition mode, proceeding to step 403, the portable terminal collects situation information, and determines a user situation on the basis of the collected situation information. For example, the situation information includes at least one of user location data (e.g., a GPS measurement value), a current time, a frequently used application, a user's call/communication history, an SMS/SNS usage history, and the like. For example, the user situation include at least one of a current user location, information on whether the user is located in a POI, a POI class (e.g., office, school, and home), information on whether the user is on the move or stationary, a list of applications most frequently used at a current time zone, a communication means/counterpart most frequently used at the current time zone, and so forth.

In step 405, the portable terminal displays at least one function icon corresponding to at least one gesture usable in the user situation determined in step 403. For example, the portable terminal displays an icon that represents a matching relation between each function and gesture by using the display means. However, step 405 can be omitted in some embodiments.

In step 407, the portable terminal determines a user's gesture by using at least one sensor measurement value. That is, the portable terminal searches for a gesture corresponding to the at least one sensor measurement value input from a DB that includes information regarding data of gestures, that is, information for expressing gestures by using at least one sensor measurement value. For example, in the DB, each of the gestures can be expressed by a combination of specific sensor measurement values, time-series sensor measurement values conforming to a specific order, and the like. Herein, the at least one sensor measurement value includes at least one of an accelerator sensor measurement value, an earth's magnetic sensor measurement value, a pressure sensor measurement value, and an angular velocity measurement value.

After determining the gesture, proceeding to step 409, the portable terminal determines a function corresponding to the gesture determined in step 407 and a function corresponding to the user situation determined in step 403. For example, the portable terminal determines a function to be executed by using a table that defines a matching relation of a function with respect to a gesture and a user situation. Herein, although the table may have a different structure according to a detailed embodiment, the table defines a function corresponding to the gesture and the user situation. For example, the table may have the structure of FIG. 2A or FIG. 2B. If the structure of FIG. 2A is used, the portable terminal combines the determined gesture and the determined user situation, and searches for a function corresponding to the combination. If the structure of FIG. 2B is used, the portable terminal searches candidate functions corresponding to the determined user situation, and selects one function corresponding to the determined gesture among the candidate functions.

After determining the function, proceeding to step 411, the portable terminal executes the determined function. For example, the function may be one of a plurality of functions provided by the portable terminal, such as an electronic book, a phone book, a text viewer, a video/music player, and the like.

Figure 5:
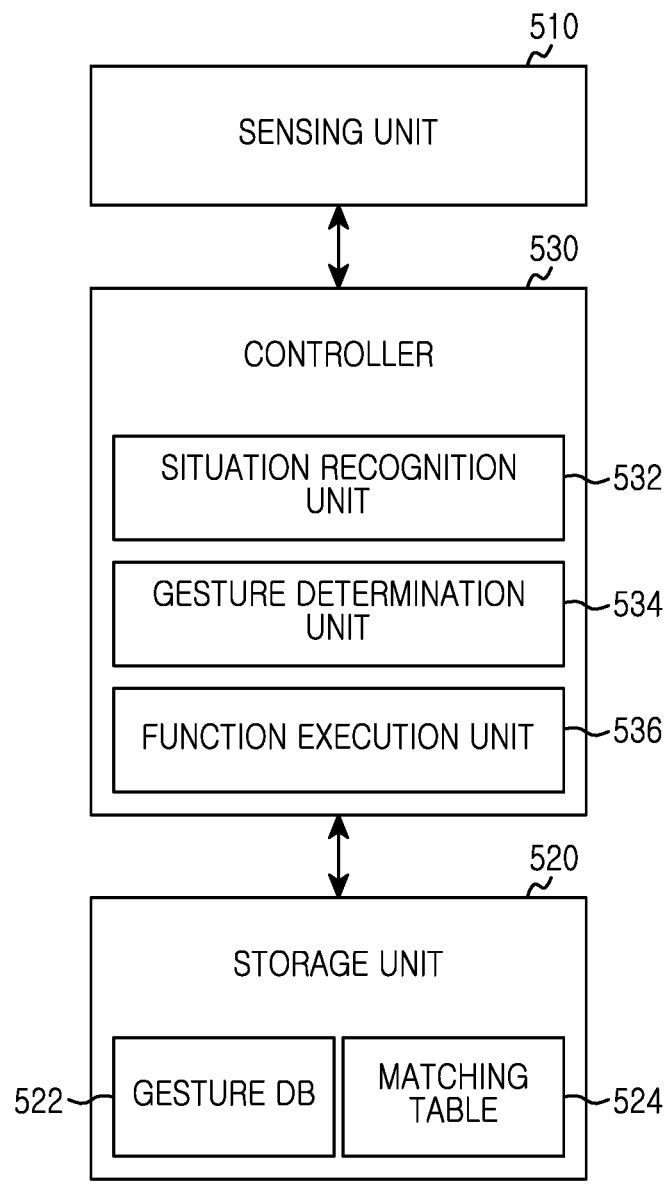
FIG. 5 is a block diagram of a portable terminal according to an embodiment of the present disclosure.

FIG. 5 is a block diagram of a portable terminal according to an embodiment of the present disclosure.

Referring to FIG. 5, the portable terminal includes a sensing unit 510, a storage unit 520, and a controller 530.

The sensing unit 510 includes at least one sensor, and provides a sensor measurement value for gesture recognition to the controller 530. For example, the at least one sensor may include an accelerator sensor, an earth's magnetic sensor, a pressure sensor, an angular velocity sensor, and the like.

The storage unit 520 stores a basic program for operating the portable terminal, an application program, and data such as user contents. In addition, the storage unit 520 provides the stored data at the request of the controller 530. In particular, the storage unit 520 includes a gesture DB 522 and a matching table 524. The gesture DB 522 includes information regarding data of gestures, that is, information for expressing gestures by using at least one sensor measurement value. For example, each of the gestures can be expressed by a combination of specific sensor measurement values, time-series sensor measurement values conforming to a specific order, and the like. The matching table 524 defines a matching relation of a function with respect to a gesture and a user situation. Herein, although the matching table 524 may have a different structure according to a detailed embodiment, the table defines a function corresponding to the gesture and the user situation. For example, the matching table 524 may have the structure of FIG. 2A or FIG. 2B.

The controller 530 provides overall control to the portable terminal. In particular, the controller 530 recognizes a user's gesture according to the embodiment of the present disclosure, and provides control to determine and execute a function corresponding to the gesture by considering the user situation. More specifically, the controller 530 includes a situation recognition unit 532 for recognizing the user situation, a gesture determination unit 534 for determining the gesture, and a function execution unit 536 for determining and executing a function corresponding to the user gesture and the user situation.

The controller 530 for recognizing and processing the gesture operates as follows. First, the controller 530 determines whether to enter a gesture recognition mode. For example, whether to enter the gesture recognition mode can be determined according to whether a key (not shown) is input or whether a predefined start gesture occurs. If the portable terminal is in a sleep state, the portable terminal is released from the sleep state by an additional key input. Alternatively, the portable terminal employs an additional low power processor, and recognizes the predefined start gesture by the low power processor during the sleep state. When using the low power processor, the portable terminal may be released from the sleep state right after recognizing the predefined start gesture, or may be released from the sleep state after recognizing the gesture for executing a function, or may be released from the sleep state after determining the function.

When entering the gesture recognition mode, the situation recognition unit 532 collects situation information, and determines the user situation on the basis of the collected situation information. Further, the gesture determination unit 534 determines a user's gesture by using at least one sensor measurement value provided from the sensing unit 510 and the gesture DB 522 stored in the storage unit 520. That is, the gesture determination unit 534 searches the DB 522 to find a gesture corresponding to the at least one sensor measurement value. Thereafter, the function execution unit 536 determines a function corresponding to the gesture determined by the gesture determination unit 534 and the user situation determined by the situation recognition unit 532. For example, the function execution unit 536 determines a function to be executed by using the matching table 524. Further, the function execution unit 536 executes the determined function.

Although not shown in FIG. 5, the portable terminal may further include a display means. For example, the display means may be a Liquid Crystal Display (LCD), an Organic Light-Emitting Diode (OLED), and the like. When using the display means, if the user situation is determined by the situation recognition unit 532, the controller 530 can display at least one function icon corresponding to at least one gesture by using the display means usable in the user situation.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. An electronic device, comprising:
   a memory;
   a motion sensor;
   a first, low-power consuming processor operatively coupled to the motion sensor; and
   a second processor operatively coupled to the first processor,
   wherein, while the second processor is in a sleep state, the first processor is configured to:
      obtain a first sensing result comprising a first set of sensor measurement values from the motion sensor,
      determine whether the first sensing result corresponds to a start period for a gesture input,
      in response to determining that the first sensing result corresponds to the start period of the gesture input, obtain a second sensing result comprising a second set of sensor measurement values from the motion sensor,
      recognize the second sensing result as the gesture input, wherein the gesture input is associated with execution of one of a plurality of candidate applications, and
      based on recognizing the second sensing result as the gesture input, provide a signal to the second processor to switch the second processor from the sleep state to a wake-up state, wherein the signal includes data regarding the gesture input, and
   wherein the second processor is configured to:
      based on obtaining the signal from the first processor, switch the sleep state to the wake-up state,
      obtain context information including current geographical information of the electronic device,
      identify an application corresponding to the context information of the electronic device among the plurality of candidate applications designated for the gesture input, and
      execute the identified application.

2. The electronic device of claim 1, wherein the context information further includes at least one of a frequently used software application, a user's communication history, a Short Message Service (SMS) usage history, or a Social Network Service (SNS) usage history.

3. The electronic device of claim 1, wherein the context information further includes a list of software application most frequently used at a current time zone, or a communication means most frequently used at the current time zone.

4. The electronic device of claim 1, wherein the motion sensor comprises at least one of an accelerator sensor, an earth's magnetic sensor, or a pressure sensor.

5. The electronic device of claim 1, wherein identifying the application includes searching a table to determine the application to be executed, and
wherein the table includes at least one of a gesture list, user situation lists that are dependent on respective gestures, or an application list corresponding to a combination of a plurality of gestures and a plurality of classes.

6. The electronic device of claim 1, further comprising a display,
wherein the second processor is further configured to:
display at least one software application icon corresponding to the gesture input to be received based on the context information.

7. The electronic device of claim 1, wherein executing the identified application comprises:
executing a first application corresponding to the gesture input, if the context information indicates a first location, and
executing a second application corresponding to the gesture input, if the context information indicates a second location,
wherein the first application is different from the second application.

8. A method executed at an electronic device with a motion sensor, a first, low power consuming processor and a second processor operatively coupled to the first processor, the method comprising:
while the second processor is in a sleep state:
obtaining, by the first processor, a first sensing result comprising a first set of sensor measurement values from the motion sensor,
determining, by the first processor, whether the first sensing result corresponds to a start period of a gesture input,
in response to determining that the first sensing result corresponds to the start period of the gesture input, obtain a second sensing result comprising a second set of sensor measurement values from the motion sensor,
recognizing the second sensing result as the gesture input, wherein the gesture input is associated with execution of one of a plurality of candidate applications,
based on recognizing the second sensing result as the gesture input, providing, by the first processor, a signal to the second processor to switch the second processor from the sleep state to a wake-up state, wherein the signal includes data regarding the gesture input,
based on obtaining the signal from the first processor, switching, by the second processor, the sleep state to the wake-up state,
obtain, by the second processor, data regarding context information including current geographical information of the electronic device,
identifying, by the second processor, an application corresponding to the context information among the plurality of candidate applications designated for the gesture input, and
executing, by the second processor, the identified application.

9. The method of claim 8, wherein the context information further includes at least one of a frequently used software application, a user's call/communication history, a Short Message Service (SMS) usage history, or a Social Network Service (SNS) usage history.

10. The method of claim 8, wherein the context information comprises one of: a list of software applications most frequently used at a current time zone, or a communication means most frequently used at the current time zone.

11. The method of claim 8, wherein the motion sensor comprises at least one of an accelerator sensor, an earth's magnetic sensor, a pressure sensor measurement value, or an angular velocity measurement value.

12. The method of claim 8, wherein the identifying the application includes searching a table to determine a software application to be executed,
wherein the table includes at least one of a gesture list, user situation lists that are dependent on respective gestures, or an application list corresponding to a combination of a plurality of gestures and a plurality of classes.

13. The method of claim 8, further comprising:
displaying at least one software application icon corresponding to the gesture input to be received based on the context information.

\* \* \* \* \*